(12) United States Patent
Kallin

(10) Patent No.: US 9,098,089 B2
(45) Date of Patent: Aug. 4, 2015

(54) MEDIA ALIGNMENT

(71) Applicant: NCR CORPORATION, Duluth, GA (US)

(72) Inventor: Fredrik L. N. Kallin, Waterloo (CA)

(73) Assignee: NCR Corporation, Duluth, GA (US)

(*) Notice: Subject to any disclaimer, the term of this patent is extended or adjusted under 35 U.S.C. 154(b) by 103 days.

(21) Appl. No.: 13/772,057

(22) Filed: Feb. 20, 2013

(65) Prior Publication Data

US 2014/0236344 A1  Aug. 21, 2014

(51) Int. Cl.
G06F 7/00 (2006.01)
G05D 3/10 (2006.01)
B65H 7/10 (2006.01)
B65H 9/16 (2006.01)

(52) U.S. Cl.
CPC .. G05D 3/10 (2013.01); B65H 7/10 (2013.01); B65H 9/163 (2013.01); *B65H 2404/1421* (2013.01); *B65H 2511/216* (2013.01); *B65H 2555/26* (2013.01); *B65H 2701/1912* (2013.01)

(58) Field of Classification Search
USPC .......................................................... 700/218
See application file for complete search history.

(56) References Cited

U.S. PATENT DOCUMENTS

| 5,320,340 A * | 6/1994 | Bay ................................ 271/225 |
| 7,027,076 B2 * | 4/2006 | Ruiz et al. ...................... 347/190 |
| 2004/0046313 A1 * | 3/2004 | Herrmann et al. ............ 271/226 |
| 2011/0042887 A1 * | 2/2011 | Kallin et al. ................... 271/227 |
| 2013/0032995 A1 * | 2/2013 | Cha ............................... 271/228 |

* cited by examiner

*Primary Examiner* — Gene Crawford
*Assistant Examiner* — Kyle Logan
(74) *Attorney, Agent, or Firm* — Joseph P. Mehrle

(57) ABSTRACT

A media alignment device is described. The device comprises: a media drive turret including a drive member; and a controller. The controller is operable to: receive information about a lateral position of a media item as the media item is transported longitudinally along a transport path, rotate the media drive turret to an angular position required to drive the media item to an aligned position, and activate the drive member to move the media item in a direction transverse to the transport path.

4 Claims, 4 Drawing Sheets

MEDIA ALIGNMENT

FIELD OF INVENTION

The present invention relates to media alignment.

BACKGROUND OF INVENTION

Media alignment is important in a self-service terminal (SST) and a SST module that receives media items from a user. One type of SST module that benefits from media alignment is a banknote deposit module. Another type of SST module that benefits from media alignment is a banknote recycler module (that is, a module that can receive a banknote from one customer and can then dispense the received banknote to a subsequent customer).

To provide optimal loading in such a module, it is typically desirable to centralize a media item (such as a banknote) with respect to an entrance to a deposit bin or recycler cassette (the "store entrance"). This ensures optimal filling of the bin or cassette. However, a module typically receives different sizes of banknote (due to different sizes of denominations within one currency, or different currencies), so aligning a media item with the store entrance may require the media item to be moved by a different amount, depending on the size of the media item.

A further complication in loading a media item into the store entrance is that the media item may become skewed as it is transported through the module. It would be advantageous to deskew the media item in addition to centralizing the media item, thereby providing more efficient and reliable loading of the deposit bin or recycler cassette.

SUMMARY OF INVENTION

Accordingly, the invention generally provides methods, systems, apparatus, and software for aligning a media item with an entrance to a media receptacle.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a media alignment device comprising: a media drive turret including a drive member; and a controller operable to: (i) receive information about a lateral position of a media item as the media item is transported longitudinally along a transport path, (ii) rotate the media drive turret to an angular position required to drive the media item to an aligned position, and (iii) activate the drive member to move the media item in a direction transverse to the transport path.

The drive member may comprise an upper roller and a lower roller. The lower roller may comprise a driven roller, and the upper roller may comprise an idler roller; alternatively, lower roller may comprise an idler roller, and the upper roller may comprise a driven roller.

The driven roller may be powered by a motor, such as a stepper motor.

The upper roller may be mounted on an upper turntable and the lower roller may be mounted on a lower turntable.

The upper and lower turntables may be driven by a stepper motor. Preferably, the stepper motor is able to rotate the turntables in relatively small angular amounts to provide accurate and fine control of the turntables. Advantageously, the stepper motor may be able to rotate the turntables in increments of less than one degree. A micro-stepper motor may be used that is able to increment by angles of less than one degree. Alternatively, a stepper motor may drive a pulley and/or gear reduction system that converts the angular increment imparted by the stepper motor to a smaller angular change to the turntables. This may be implemented, for example, by the stepper motor driving a small pulley that is coupled to a larger pulley on the upper and/or lower turntables. Optionally, finer position increments can be achieved by using a micro-stepping version of a stepper motor and controlling the motor position to fractions of a step angle.

The upper turntable may be coupled to an upper transport guide by bearings mounted on a race, thereby facilitating smooth rotation of the upper turntable relative to the upper transport guide.

Similarly, the lower turntable may be coupled to a lower transport guide by bearings mounted on a race, thereby facilitating smooth rotation of the lower turntable relative to the lower transport guide.

The media alignment device may further comprise a deskew mechanism. The deskew mechanism may comprise a pair of media item drives, each media item drive being controlled by a separate motor. Each media item drive may comprise a driven roller. Alternatively, but less preferably, each media item drive may comprise an endless belt.

Each driven roller may comprise an arcuate outer surface to reduce the contact point size between the media item being deskewed and the driven roller. The deskew mechanism may further comprise an idler roller opposite each of the driven rollers. The idler rollers may also comprise an arcuate outer surface. Each idler roller may comprise a lower friction material than the corresponding driven roller.

The controller may be operable to activate each separate motor at a different speed and/or for a different length of time to ensure that a skewed media item is deskewed by the differential drive provided by the separate motors.

Preferably, the deskew mechanism is downstream of the transport path relative to the media drive turret. By having the deskew mechanism downstream of the media drive turret, it is possible to move the media item away from a sidewall (such as a guiding edge) prior to deskewing the media item, this ensures that deskewing the media item is more reliable. A further advantage of deskewing a media item subsequent to aligning that media item is that it ensures that both media item drives in the deskew mechanism (not just one media item drive) engages with the media item.

In some embodiments the media drive turret may be provided at the same spatial location, and in the same mechanism, as the deskew mechanism so that the functions of media alignment and deskewing are provided at the same location. However, by separating the deskew mechanism from the media drive turret it is possible to have a higher throughput of media items and to ensure that the deskew operation is more reliable because the media item is moved away from any sidewall prior to any attempt at deskewing.

According to a second aspect there is provided a media handler including the media alignment device of the first aspect and further including an upper transport guide and a lower transport guide, between which guides a media item is transported, and at least one sensor for detecting alignment of the media item.

The sensor may comprise a linear array of spot sensors, a two-dimensional array of spot sensors, an imaging device, or the like.

The media handler may further comprise a deskew mechanism.

According to a third aspect there is provided a self-service terminal for receiving media items in a media handler according to the second aspect.

The self-service terminal may comprise an automated teller machine (ATM).

According to a fourth aspect there is provided a method of aligning a media item, the method comprising (i) sensing a lateral position of a media item being transported longitudinally along a transport path, (ii) obtaining a drive angle required to drive the media item towards an aligned position, (iii) rotating a media drive turret to the obtained drive angle, and (iv) driving the media item to the aligned position by activating a drive member in the media drive turret.

The step of sensing a lateral position of a media item may be implemented using a single imaging sensor. However, it may be more cost effective to use a plurality of spot sensors.

The step of obtaining a drive angle required to drive the media item towards an aligned position may be implemented by calculating the drive angle based on the sensed lateral position. Alternatively, the step of obtaining a drive angle required to drive the media item towards an aligned position may be implemented by accessing a table storing a plurality of lateral positions and a corresponding drive angle for each of the lateral positions.

The method may further comprise deskewing the media item subsequent to aligning the media item.

The step of deskewing the media item may further comprise: detecting an angle of an edge of the media item as it is moving along the transport path, obtaining a skew angle based on the detected edge angle, and activating a deskewing mechanism to ensure that the skew angle is removed and a leading edge of the media item is transported substantially normal to the transport path.

The step of activating a deskewing mechanism may comprise applying a greater drive to one of a pair of rollers than to the other roller in the pair of rollers. The greater drive is applied to a side of the media item that is lagging the other side. The greater drive may be implemented by driving one roller for longer than the other roller, by driving one roller faster than the other roller, or in any other convenient manner.

For clarity and simplicity of description, not all combinations of elements provided in the aspects recited above have been set forth expressly.

Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
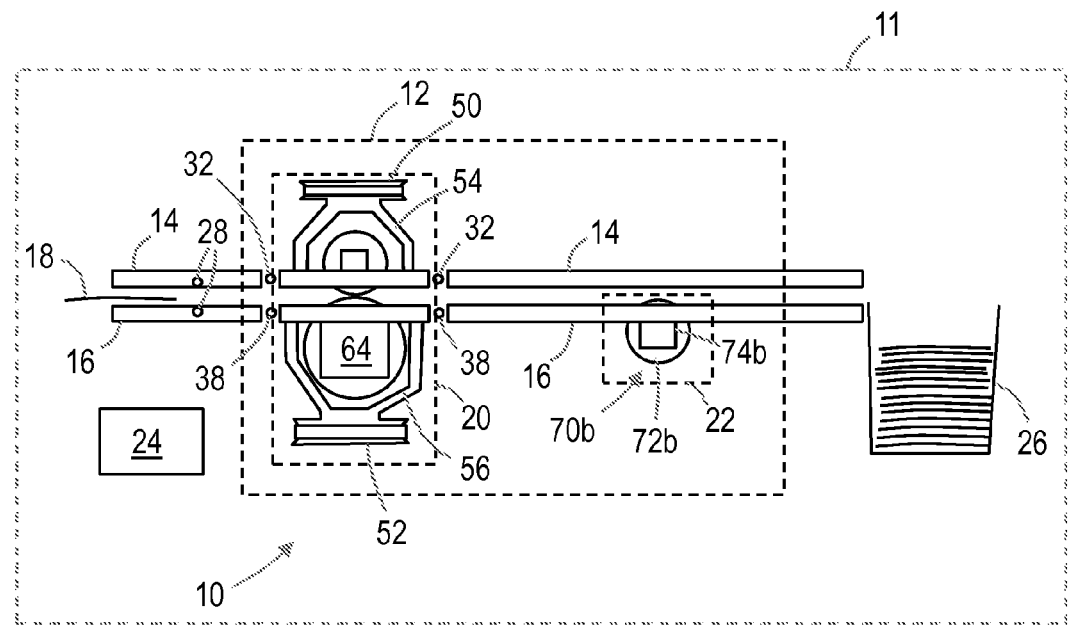
FIG. 1 is a simplified schematic front elevation diagram of a transport section of a media handler, where the transport section includes a media alignment device according to one embodiment of the present invention.

Reference will now be made to FIG. 1, which is a simplified schematic front elevation diagram of a transport section 10 of a media handler (shown generally by broken line box 11), where the transport section 10 includes a media alignment device 12 according to one embodiment of the present invention.

The transport section 10 comprises an upper fixed guide 14 and a lower fixed guide 16. Each of these fixed guides 14,16 comprises a combination of skid plates, rollers, and/or belts (not shown in detail) to transport a media item (in the form of a banknote in this embodiment) 18 therealong in a known manner.

The media alignment device 12 comprises a centralization mechanism 20, in the form of a media drive turret, and a deskew mechanism 22. The media drive turret 20 couples to both the upper and lower fixed guides 14,16; and the deskew mechanism 22 partly protrudes through the lower fixed guide 16.

A controller 24 is provided to control, inter alia, transport of media items 18 along the transport section 10, including operation of the media alignment device 12. A deposit bin 26 is also illustrated at one end of the transport section 10.

Media position sensors 28 are located upstream of the media drive turret 20 (that is, at a position where a media item 18 will pass before it reaches the media drive turret 20).

Figure 2:
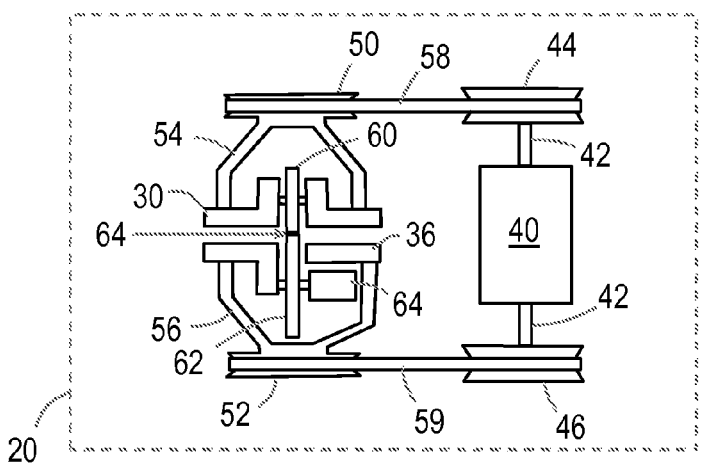
FIG. 2 is a simplified schematic side elevation diagram illustrating one part (a media drive turret) of the media alignment device of FIG. 1 in more detail.

Reference will now also be made to FIG. 2, which is a simplified schematic side elevation diagram illustrating the media drive turret 20 in more detail.

The media drive turret 20 comprises an upper turntable 30 which is coupled to the fixed upper guide 14 by bearings 32 (best seen in FIG. 1) mounted on races (not shown in detail), thereby enabling the upper turntable 30 to be rotated relative to the fixed upper guide 14.

Similarly, the media drive turret 20 also comprises a lower turntable 36 which is coupled to the fixed lower guide 16 by bearings 38 mounted on races (not shown in detail), thereby enabling the lower turntable 36 to be rotated relative to the lower transport guide 16.

The upper and lower turntables 30,36 are rotated by a micro-drive stepper motor 40 via a double-ended shaft 42 and upper and lower pulleys 44,46 on the micro-drive motor 40, and upper and lower pulleys 50,52 on the upper and lower turntables 30,36, respectively.

The upper turntable pulley 50 is fixed to the upper turntable 30 by an upper frame 54; similarly, the lower turntable pulley 52 is fixed to the lower turntable 36 by a lower frame 56. Frame 54 ensures that there is no relative movement between the upper turntable pulley 50 and the upper turntable 30. Frame 56 ensures that there is no relative movement between the lower turntable pulley 52 and the lower turntable 36.

The micro-drive stepper motor 40 is able to rotate the upper and lower turntables 30,36 in increments of one degree via an upper belt 58 (which is located around the upper pulley 44 and the upper turntable pulley 50), and a lower belt 59 (which is located around the lower pulley 46 and the lower turntable pulley 52). If finer control is required, a reduction system (comprising pulleys of different sizes, and/or different gear sizes) may be used to ensure that one increment of the micro-drive stepper motor 40 (rotation by a first angular amount) imparts a smaller angle (a second angular amount smaller than the first angular amount) of rotation to the upper and lower turntables 30,36.

The upper turntable 30 includes an idler roller 60, and the lower turntable 36 includes a drive roller 62 rotated by a dedicated stepper motor 64. The idler roller 60 and the drive roller 62 combine to provide a drive member.

The idler roller 60 and the drive roller 62 have a generally flat outer surface so that a relatively large contact area ("engaging point") 64 is provided where the rollers 60,62 contact each other. During operation, a media item 18 (such as a banknote) is transported between the idler roller 60 and the drive roller 62.

By activating the micro-drive stepper motor 40, the controller 24 is able to rotate the upper and lower turntables 30,36 to any desired angular position. This has the effect of rotating the idler roller 60 and drive roller 62 to a desired position because the orientation of these rollers 60,62 is fixed in relation to the turntables 30,36.

Figure 3:
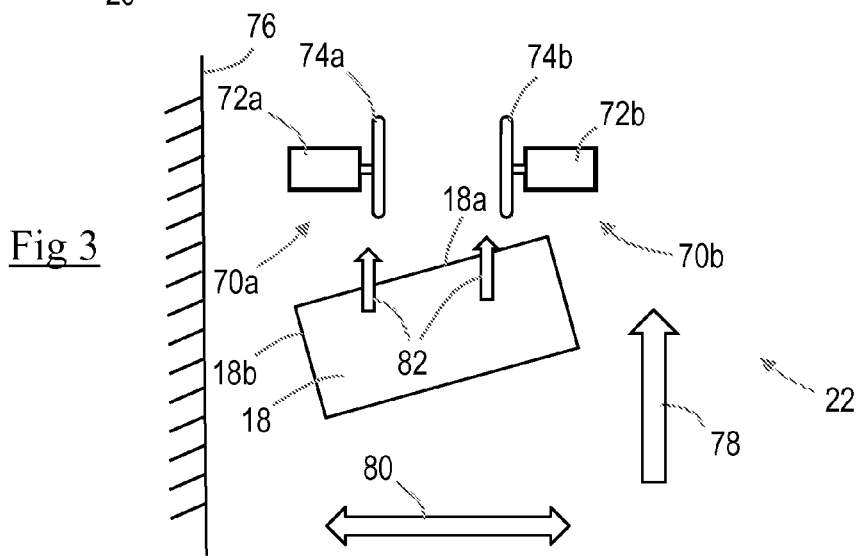
FIG. 3 is a simplified schematic plan diagram illustrating another part (a deskew mechanism) of the media alignment device downstream of the media drive turret of FIG. 2.

Reference will now be made to FIG. 3, which is a simplified schematic plan diagram illustrating the deskew mechanism 22 in more detail.

The deskew mechanism 22 comprises a pair of individually-controlled drive rollers 70*a,b*. Each drive roller 70 comprises a precision stepper motor 72*a,b* and a rounded-end drive roller 74*a,b*. Having rounded ends on the drive rollers 74*a,b*, provides a relatively small point contact with the banknote 18 at each of the two drive rollers 74*a,b*. This reduces the resistance of the banknote 18 to pivoting about each roller 74*a,b*, which is important because the deskew operation relies on rotating the banknote 18.

As illustrated in FIG. 3, the deskew mechanism 22 is spaced apart from a guiding edge 76 of the transport section 10. This ensures that the deskew mechanism 22 is able to rotate the banknote 18 (provided the banknote 18 has been centralized) and thereby to remove any skew in the banknote 18.

The banknote 18 is transported along the transport section 10 (that is, through the media drive turret 20, through the deskew mechanism 22, and into the deposit bin 26) in a longitudinal direction, illustrated by arrow 78.

As will be described in more detail below, when the banknote 18 is transported through the media drive turret 20, it is also moved in a lateral direction, which is normal to the longitudinal direction, as illustrated by double-headed arrow 80. Arrows 82 indicate the direction of travel of the banknote 18 when moved through the transport section 10.

Figure 4:
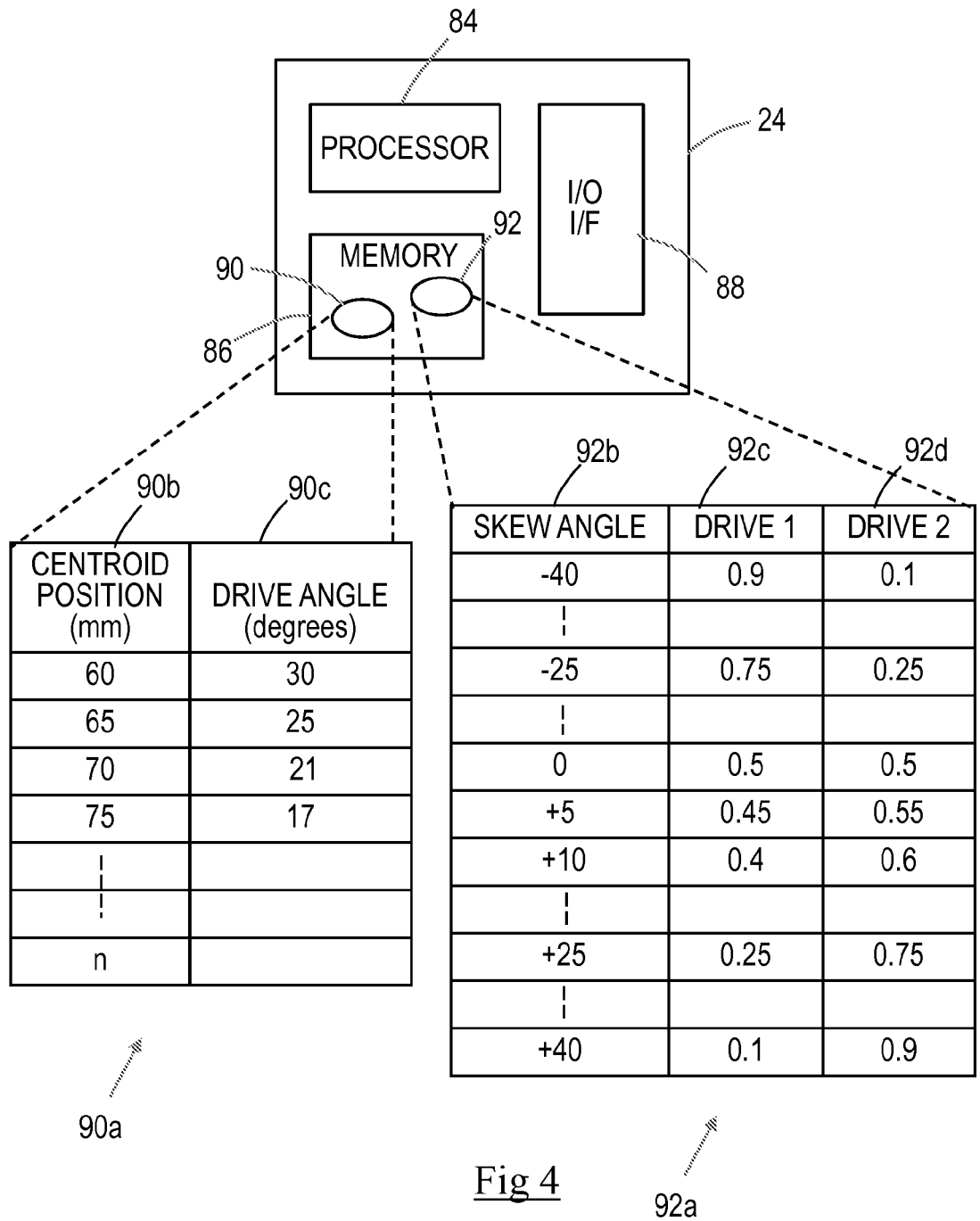
FIG. 4 is a simplified block diagram of another part (a controller) of the media alignment device of FIG. 1.

Reference will now also be made to FIG. 4, which is a simplified block diagram of the controller 24. The controller 24 comprises a processor 84, a memory 86, and an input/output interface 88. The memory 86 includes a centralization file 90 and a deskew file 92.

The centralization file 90 includes a table 90*a* comprising a centroid position column 90*b* and a corresponding drive angle column 90*c*. It should be appreciated that the specific drive angle required will depend on the geometry of the transport section 10, the size of the banknote 18, and the like. The numbers provided in table 90*a* are merely for illustration and are not intended to be accurate. In any event, centralization and deskew do not need to be exact, as there are variations in the sizes of the same denomination due to stretching, shrinkage, or the like.

The deskew file 92 includes a table 92*a* comprising a skew angle column 92*b* and two corresponding drive speed columns 92*c,d*, one drive speed column for each of the precision stepper motors 72*a,b* respectively. It should be appreciated that the drive speeds shown in table 92*a* are provided in the form of ratios of one drive speed to the other, rather than an absolute drive speed. The numbers provided in table 92*a* are merely for illustration and are not intended to be accurate.

These files 90,92 enable the processor 84 to control the media drive turret 20 and the deskew mechanism 22 so that the banknote 18 is first centralized and then deskewed, as will be described in more detail below.

The I/O interface 88 enables the processor 84 to control the various motors 40,72*a*, 72*b* (and other motors that are not shown) that are used to transport the banknote 18 along the transport section 10 to the deposit bin 26.

Figure 5:
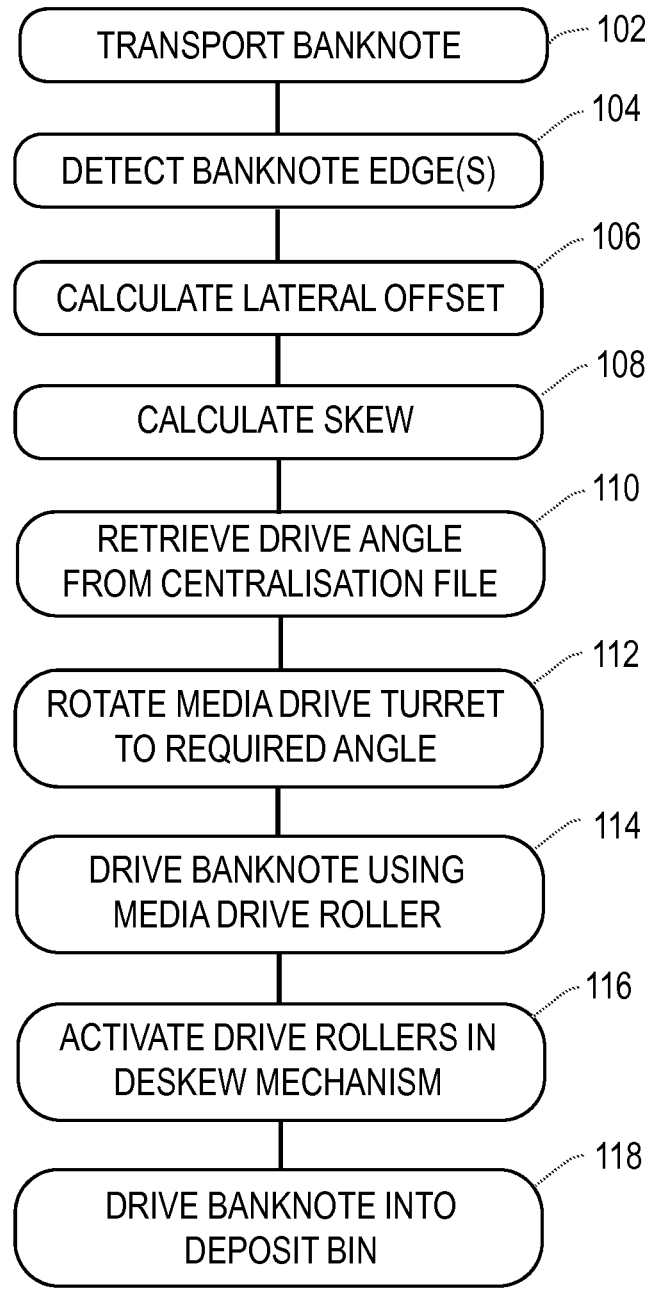
FIG. 5 is a flowchart illustrating steps implemented the controller of FIG. 4 in aligning a media item as it is transported through the transport section of FIG. 1.

Reference will now be made to FIG. 5, which is a flowchart 100 illustrating steps implemented by the controller 24 in aligning the banknote 18 as it is transported through the transport section 10.

Initially, the controller 24 transports the banknote 18 passed the media position sensors 28 and towards the media drive turret 20 (step 102). The media position sensors 28 comprise a linear array of sensors extending laterally across a longitudinal transport path along which the banknote 18 is conveyed.

The controller 24 uses the media position sensors 28 to detect a leading edge 18*a* (FIG. 3) and a side edge 18*b* (FIG. 3) of the banknote 18 (step 104). The controller 24 may also detect the remaining two edges of the banknote 18.

Once these edges have been detected, the processor 84 uses this edge information to calculate (i) a lateral position of a centroid of the banknote 18 relative to the guiding edge 76 (FIG. 3) (step 106), and (ii) a rotational (or skew) angle of the banknote 18 relative to the guiding edge 76 (step 108).

The processor 84 then accesses the centralization file 90 and uses the calculated lateral position of the centroid of the banknote 18 to retrieve the corresponding drive angle from table 90*a* (step 110). The processor 84 then activates the micro-drive motor 40 to rotate the media drive turret 20 to the retrieved drive angle (step 112).

Once the micro-drive motor 40 has rotated the media drive turret 20 to the retrieved drive angle, the processor 84 activates the stepper motor 64 to advance the drive roller 62, so that the banknote 18 is moved laterally towards an alignment position as the banknote 18 passes over the drive roller 62 (step 114).

The processor 84 then uses the rotational (or skew) angle of the banknote 18 (calculated in step 108) to retrieve from the table 92*a* the differential drive speeds needed to deskew the banknote 18. The processor 84 then applies these differential drive speed ratios to the pair of precision stepper motors 72*a,b* so that the banknote 18 is deskewed when it passes through the deskew mechanism 22 (step 118).

The processor 84 then drives the centralized and deskewed banknote 18 into the deposit bin 26.

The media alignment process 100 can then be repeated for the next media item received.

Figure 6:
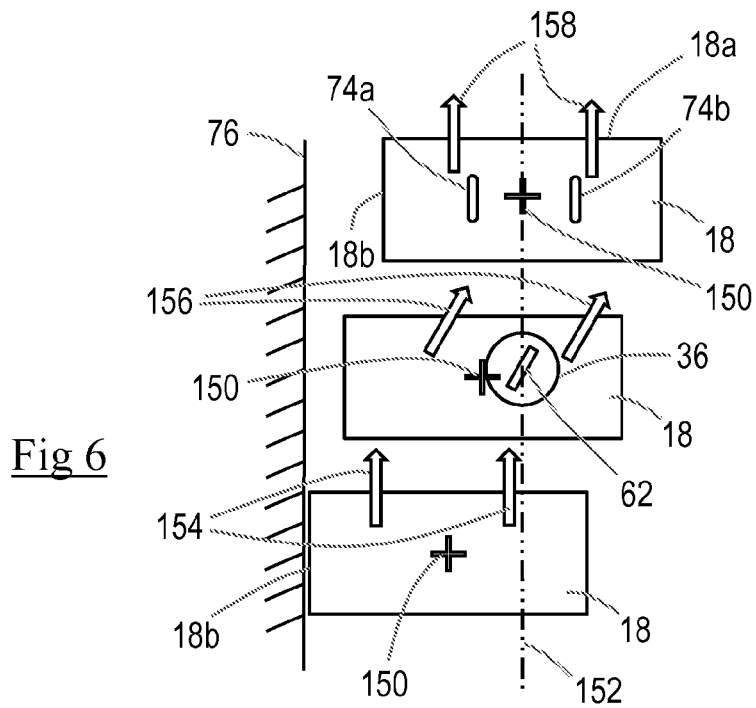
FIG. 6 is a simplified plan view illustrating an unskewed media item in three different positions as it passes through the transport section of FIG. 1.

Reference will now also be made to FIG. 6, which is a simplified plan view illustrating the (unskewed) banknote 18 in three different positions as it passes through the transport section 10. The three positions are: (i) before passing through the media drive turret 20, (ii) within the media drive turret 20, and (iii) over the deskew mechanism 22.

To aid understanding, a centroid 150 (shown as a cross) of the banknote 18 is illustrated, in addition to a centerline 152 to which the banknote 18 is to be aligned. The centerline 152 is spaced approximately 95 mm from the guiding edge 76.

In this embodiment, the banknote 18 is a five Euro banknote having dimensions 120 mm by 60 mm. As can be seen from FIG. 6, the banknote 18 is not skewed; that is, the side edge 18b is parallel to (and in this example abuts) the guiding edge 76. This is not unusual because transporting media items, such as banknotes, is more reliable if the media items are registered with a guiding edge.

The banknote 18 is driven by the transport section 10 in the direction of arrows 154. This does not appreciably change either the lateral position or the rotation of the banknote 18.

The media position sensors 28 (not shown in FIG. 6 for clarity) sense the position of this banknote 18 and the processor 84 retrieves the correct drive angle from table 90a; which in this example is thirty degrees.

The processor 84 then rotates the media drive turret 20 (only the lower turntable 36 and drive roller 62 are shown in FIG. 6) to an angle of thirty degrees with respect to the centerline 152. The drive roller 62 has a diameter of 20 mm and is oriented at thirty degrees to the centerline 152 because of the media drive turret 20 orientation.

When the banknote 18 reaches the media drive turret 20, the banknote 18 is then driven only by the drive roller 62 (which is angled at 30 degrees). As a result, the centroid 150 of the banknote 18 moves approximately 35 mm away from the guiding edge 76, so that the centroid 150 is now aligned with the centerline 152. This movement of the banknote 18 is illustrated by arrows 156.

The individually-controlled drive motors 70 (only drive rollers 74 are shown in FIG. 6) are both actuated at the same speed because there is no skew (or rotation) that needs to be removed.

The banknote 18 is then transported into the deposit bin 26 for storage.

Figure 7:
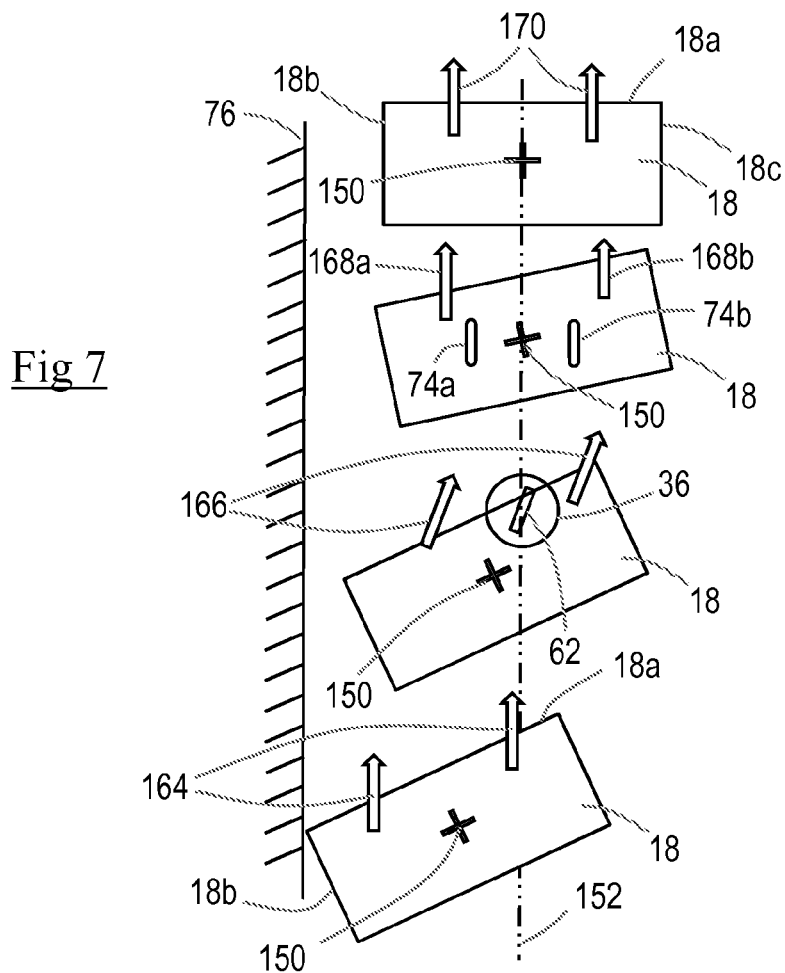
FIG. 7 is a simplified plan view illustrating a skewed media item in four different positions as it passes through the transport section of FIG. 1.

Reference will now also be made to FIG. 7, which is a simplified plan view illustrating the banknote 18 in four different positions as it passes through the transport section 10. The four positions are: (i) before passing through the media drive turret 20, (ii) within the media drive turret 20, (iii) over the deskew mechanism 22, and (iv) beyond the deskew mechanism 22.

In this example, the five Euro banknote 18 is skewed; that is, the side edge 18b is not parallel to the guiding edge 76. The specific example shown is a skew of minus twenty-five degrees to the guiding edge 76.

The banknote 18 is driven by the transport drive (not shown) in the direction of arrows 164. This drive does not change either the lateral position or the rotation of the banknote 18 (which remains skewed at approximately minus twenty-five degrees).

The media position sensors 28 (not shown in FIG. 7 for clarity) sense the position of this banknote 18 (both the lateral position of the centroid 150 and the rotation). In this example, the centroid position 150 is approximately 67 mm.

The processor 84 then retrieves the correct drive angle from table 90a based on the sensed lateral position of the centroid 150 of the banknote 18. In this example, the centroid position is part-way between two entries in the table 90a, so the processor 84 applies a linear interpolation. In this example, the drive angle is interpolated as approximately twenty-three degrees.

The processor 84 also retrieves the correct drive speed ratios from table 92a based on the sensed rotation of the banknote 18; that is, minus twenty-five degrees. In this example, the drive speed ratios from table 92a for drive roller 74a and drive roller 74b, respectively, are 3:1 (0.75 and 0.25).

The processor 84 then rotates the media drive turret 20 (only the lower turntable 36 and drive roller 62 are shown in FIG. 7) to the retrieved correct drive angle (which in this example is approximately twenty-three degrees with respect to the centerline 152). The drive roller 62 is therefore oriented at twenty-three degrees to the centerline 152.

When the banknote 18 reaches the media drive turret 20, the banknote 18 is then driven only by the drive roller 62 (which is angled at 23 degrees). As a result, the centroid 150 of the banknote 18 moves approximately 28 mm away from the guiding edge 76, so that the centroid 150 is now aligned with the centerline 152. This movement of the banknote 18 is illustrated by arrows 166.

To deskew the banknote 18 (that is, to remove the minus twenty-five degree rotation), the processor 84 uses the drive ratios retrieved from table 92a to drive the individually-controlled drive motors 70a,b (only drive rollers 74a,b are shown in FIG. 7) at different speeds. As illustrated by arrow 168a, which is larger than arrow 168b, the side 18b of the banknote 18 that is nearest the guide edge 76 is driven faster than the opposite side 18c of the banknote 18. This removes the rotation from the banknote 18 (in other words, this deskews the banknote 18).

The banknote 18 is then transported by the processor 84 towards and into the deposit bin 26 in a centralized and deskewed orientation.

Various modifications may be made to the above described embodiment within the scope of the invention, for example, the drive member in the media drive turret may comprise only an upper roller or only a lower roller. Where both upper and lower rollers are used, the lower roller may comprise a driven roller, and the upper roller may comprise an idler roller.

In other embodiments, the idler roller and the driven roller may have complementary, interengaging formations.

In other embodiments, skew sensors may be provided in addition to, and spaced apart from, the media position sensors 28.

In other embodiments, skew sensors may be located upstream of both the deskew mechanism 22 and the media drive turret 20, or only upstream of the media position sensors 28.

In other embodiments, the media item 18 may comprise a check, a ticket, or the like.

In other embodiments, different currencies and/or denominations may be used than the five Euro note described above.

In other embodiment, a finer control of the media drive turret angle may be desired. To implement this, smaller pulleys (replacing pulleys 44,46) may be provided on the motor double-ended shaft 42 than the pulleys 50,52 on the media drive turret 20. Finer position increments can also be achieved by using a micro-stepping version of the motor 40 and controlling the motor position to fractions of a step angle.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A media alignment device comprising:
    a media drive turret including a drive member, the drive member comprises an upper roller and a lower roller, wherein the upper and lower rollers comprise an idler roller and a driven roller, and the rollers have complementary formations, and wherein the upper roller is mounted on an upper turntable and the lower roller is mounted on a lower turntable; and
    a controller operable to:
        (i) receive information about a lateral position of a media item as the media item is transported longitudinally along a transport path,
        (ii) rotate the media drive turret to an angular position required to drive the media item to an aligned position, and
        (iii) activate the drive member to move the media item in a direction transverse to the transport path.

2. A media alignment device according to claim 1, wherein the upper and lower turntables are driven by a stepper motor.

3. A media alignment device according to claim 1, wherein the upper turntable is coupled to an upper transport guide by bearings mounted on a race, thereby enabling the upper turntable to be rotated relative to the upper transport guide.

4. A media alignment device according to claim 1, wherein the controller is operable to activate each separate motor for a different length of time to ensure that a skewed media item is deskewed by the differential drive provided by the separate motors.

* * * * *